United States Patent [19]

Howe et al.

[11] Patent Number: 4,577,306
[45] Date of Patent: Mar. 18, 1986

[54] METHOD FOR OPTICALLY WRITING AND/OR READING INFORMATION ON OPTICAL RECORDING ELEMENTS

[75] Inventors: Dennis G. Howe, Fairport; Joseph J. Wrobel, Rochester, both of N.Y.

[73] Assignee: Eastman Kodak Company, Rochester, N.Y.

[21] Appl. No.: 719,622

[22] Filed: Apr. 2, 1985

Related U.S. Application Data

[60] Continuation of Ser. No. 408,399, Aug. 16, 1982, abandoned, which is a division of Ser. No. 124,381, Feb. 25, 1980, Pat. No. 4,360,908.

[51] Int. Cl.$^4$ .............................................. G11B 7/00
[52] U.S. Cl. ..................... 369/109; 369/100; 369/275; 369/286; 346/76 L
[58] Field of Search ........................ 369/100, 109–111, 369/121, 122, 275, 284, 288; 346/76 L, 135.1, 77 R, 77 E; 358/342, 344

[56] References Cited

U.S. PATENT DOCUMENTS

| | | | |
|---|---|---|---|
| 3,983,317 | 9/1976 | Gloriose | 369/109 |
| 4,032,691 | 6/1977 | Kido et al. | 346/135.1 |
| 4,139,853 | 2/1979 | Ghekiere et al. | 346/135.1 |
| 4,270,130 | 5/1981 | Houle et al. | 346/135.1 |
| 4,313,188 | 1/1982 | Bartolini et al. | 369/109 |

OTHER PUBLICATIONS

"Medium for Recording by Thermal Deformation"(17522) Research Disclosure, 11/78, pp. 38–41.

Primary Examiner—Robert L. Richardson
Attorney, Agent, or Firm—Warren W. Kurz

[57] ABSTRACT

A method for writing and/or reading information on an optical recording element, such as an optical disk, utilizes a recording element comprising a recording layer having physical and optical properties which are optimized for phase-shift read-out. The optical properties of the recording layer give rise to a non-linear relative phase shift/layer thickness curve which, in combination with a predetermined nominal thickness of the recording layer, enhances the signal-to-noise ratio of the readout signal.

6 Claims, 12 Drawing Figures

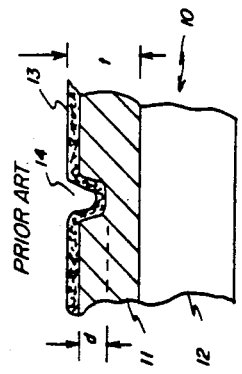
FIG. 7
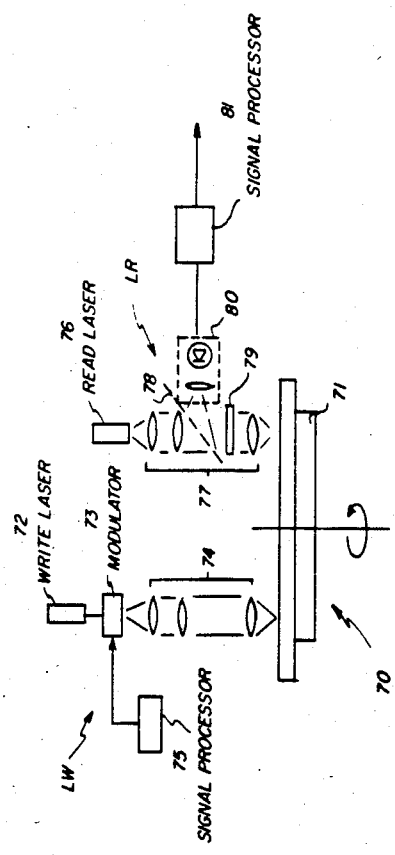
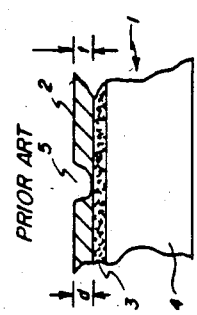
FIG. 1A
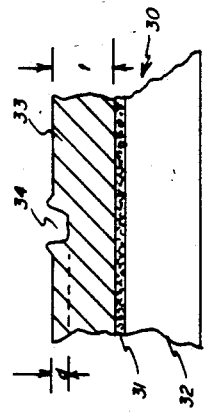
FIG. 1B
FIG. 1C

METHOD FOR OPTICALLY WRITING AND/OR READING INFORMATION ON OPTICAL RECORDING ELEMENTS

Reference is made herein to U.S. application Ser. No. 023,434 (now abandoned) entitled "Medium for Recording by Thermal Deformation" and filed Mar. 23, 1979 in the names of Thomas and Wrobel.

BACKGROUND OF THE INVENTION

1. Field of the Invention

The present invention relates to the real-time, optical writing and reading of high density information and more particularly to methods for such writing and reading.

2. Description of the Prior Art

In general, high density optical storage media carry information in the form of tracks of small (usually on the order of a micron or less in size), optically-detectable marks formed in the surface of a substrate or in thin material layer(s) deposited on a substrate. Information is recovered (read) by scanning the tracks with a tightly focussed spot of light., e.g., from a laser. The recovered information is in the form of a fluctuating electrical signal obtained from a photodetector that senses the read-out light after modulation by the track markings.

There have been a variety of approaches for achieving the general functions outlined above. Although there are others, the most popular storage media format has been a disc with a single spiral track or concentric circular tracks. For convenience, this discussion will refer to the storage media as optical discs, with the understanding that other formats are, in general, equivalent as to utility with the present invention.

With regard to record formation, i.e., recording or writing on optical discs, approaches can be divided as: (1) real-time discs (ones ready for reading immediately after writing) or (2) processed discs (ones requiring further processing after recording before they can be read). Typical of the prior art real-time disc type are heat-deformable elements comprising a substrate bearing a very thin metal or dye layer that is deformed (e.g., displaced or ablated) by the heat generated from an absorbed writing laser beam, which is modulated in intensity according to the signal to be recorded. Typical of the processed disc type are ones formed by: (1) recording exposure of a photosensitive material, such as positive photoresist; (2) chemical development of that material to form a relief pattern and (3) metallization of the relief pattern.

With regard to reading approach, the optical discs can, in one manner, be classified as being of a transmissive or reflective type, depending on whether the reading light beam passes completely through the disc to a detector on the opposite side or is reflected from the disc to a detector on the same side. The reflective type offers potential simplicity by allowing a single lens to both focus the reading beam on the disc and collect the modulated light returned from the disc.

A more subtle distinction of disc read out approaches can be made based on the type of predominating interaction between the reading light spot and the recorded marks on the disc. Thus, approaches that obtain a signal based on differences in the electric field amplitude of reading light leaving the marked and unmarked portions of the disc (e.g., because of optical density variations) can be classified as amplitude variation systems. Systems of this type can be written in real time or be processed. In distinction, approaches which obtain a signal based on differences or transitions in the phase of reading light leaving marked and non-marked portions of a disc can be characterized as phase shift systems. Systems of this type heretofore have not readily been formed in real time.

Undoubtedly there are pros and cons with respect to the desirability of the different aspects described above, particularly when it is considered that there are a variety of applications or end uses for such discs. One of the most challenging applications thus far identified for such discs is as a low-error-rate, high-density, real-time, data storage medium. One purpose of the present invention is to improve optical disc technology to better meet such challenging applications.

In such applications, and others, e.g., real time TV signal recording, information usually is encoded in the relative placement of discrete marks along a track. Thus any process which alters or impairs detection of the proper spatial frequency of the recorded marks will represent a potential noise (error) source in the demodulated electrical playback signal. At least two such noise components are directly related to the optical disc structure. The first is related to the precision with which the individual marks can be placed on the optical disc. Any variation in geometry of identically exposed marks, recorded along the signal track, will represent a "frozen in", materials-associated error. The second is related to the contrast of read-out signal obtainable from the optical disc. That is, the contrast of the light fluctuations that occur at the detector as the playback spot scans across recorded marks should be as high as possible to minimize the photon shot noise associated with optical detection. This contrast is influenced by the optical properties of the disc.

SUMMARY OF THE INVENTION

The present invention provides methods which are useful both in coping with demanding real-time applications of the type mentioned above and in decreasing such materials related noise. The methods of the invention make use of an optical recording element which, with respect to a chosen reading light wavelength, is optimized in recording stratum thickness and optical constants (e.g., refractive index and absorption parameters) for high-contrast, phase shift reading.

BRIEF DESCRIPTION OF THE DRAWINGS

The following description of preferred embodiments of the present invention is set forth with reference to the attached drawings which form a part hereof and in which:

FIGS. 1-A and 1-B are cross-sectional views of exemplary prior art optical disc structures and FIG. 1-C is a similar view of an optical disc according to one embodiment of the present invention;

FIG. 7 is a schematic diagram showing an apparatus embodiment for practice of the present invention;

DESCRIPTION OF THE PREFERRED EMBODIMENTS

Figure 2:
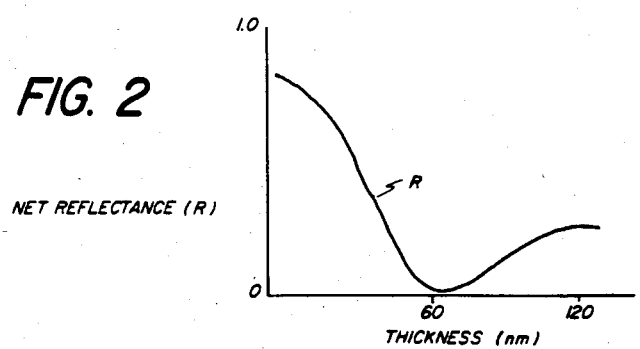
FIG. 2 is a graph illustrating the variation with respect to recording layer thickness of the reflectance of writing light for an element such as shown in FIG. 1-A.

In FIGS. 1-A and 1-B, examples of prior art record elements adapted respectively for amplitude variation and phase shift read out are illustrated. The record element 1, which is exemplary of the amplitude variation read-out type, typically has a thin light absorptive layer 2 overlying a reflective layer 3 on a support 4. The layer 2 can be formed by vapor depositing a dye that is absorptive to the writing wavelength, e.g., to a thickness in the order of 200 to 1000 Angstroms. Focussed writing light having high irradiance is used to ablate the layer to form the pit 5, thereby reducing the thickness of layer 2 and increasing the reflectance of the recorded pit area. Upon read-out, with light of the same wavelength but at reduced intensity, the reading light spot is highly reflected from the pit areas but absorbed in non-pit areas. This variation in the electric field strength, or amplitude, of the light reflected from the recorded disc is sensed by a far field detector, i.e., a detector that is located many wavelengths of light away. Amplitude variation read-out can also be obtained with monolayer discs (constructed with a thin, e.g., 200 to 400 Å, metal coating on a substrate) and with trilayer discs (constructed like the bilayer example shown in FIG. 1-A, but with a transparent dielectric layer between the absorbing layer and the reflective layer). In such prior art amplitude variation systems, any phase differences in the reading light that returns to the detector from pitted and non-pitted (i.e., recorded and non-recorded) portions is neglected.

The record element 10, which is exemplary of the prior art phase shift reading types, has a thicker layer 11 on a support 12 and includes a metallized reflective layer 13 overlying layer 11. Such elements typically are fabricated by exposing a photoresist layer according to the desired pit pattern, developing the photoresist layer to form the relief pattern and vapor depositing a protective coating over the relief. Replica discs are then formed by using this relief (or a metal tool derived therefrom) for subsequent pressing of copy discs comprised of a replicate support layer 11 in which pits such as 14 are formed. Such replicate discs are finished by metallizing the entire upper surface with the reflective coating 13. The pit depth usually is selected at a predetermined fraction of the read out light wavelength so that a substantial destructive and constructive interference condition will result (at a far field detector) as the scanned read spot is reflected from the pitted surface 13. It will be appreciated by those skilled in the art that the particular pit depth (phase shift) used depends on the selected method of detection (i.e., on the size and placement of the photodetector in the far field of light returned from the disc). This will be explained more fully in subsequent discussions regarding FIG. 7.

There are numerous variations of each of the reflective disc approaches exemplified by the FIG. 1-A and FIG. 1-B elements. Most implementations of the FIG. 1-A approach share the characteristic of being recordable in real-time with high power light of an absorbed wavelength and then readable with light of the same wavelength at a reduced power level. The recording layers of these discs have a minimum thickness so that recorded pit areas will have a substantially different reflectance than non-recorded areas. In order to provide high depth of modulation in reading light passing to the detector, and thus in the read-out signals, these elements require a read-out spot that is both tightly focussed to a size proximate that of the pit and accurately controlled to pass directly over the pit centers. As mentioned, these systems require that the read out light power not be so high as to melt ablate or bleach the non-recorded portions of the recording layer.

Disc elements of the FIG. 1-B approach can be read out at higher light intensities and do not require the focus and tracking accuracy necessary with the FIG. 1-A type discs. However, prior art discs of the FIG. 1-B type require pits which are deeper than in the FIG. 1-A approach and an overall reflective coating over the pitted and non-pitted portions. Both of these aspects militate against real-time production of such discs. Thus their potential advantages, read-out with high light intensity and less criticality as to read-out spot size and alignment, have not been obtainable for real time applications.

Referring now to FIG. 1-C, one embodiment of recording element according to the present invention will be described. It will be noted that the record element 30, like that in FIG. 1-A, has its reflective layer 31 on its support 32, beneath its recording layer 33. However the thickness "t" of the recording layer 33 is greater than that utilized in the FIG. 1-A disc types and more on the order of the FIG. 1-B disc types. A pit 34 of depth "d" is shown recorded in the layer 33.

In general, the preferred approach of the present invention is to effect real-time writing of pits 34 with a beam of a first, writing wavelength of light to which the recording layer is absorptive and to effect read-out of the record element thus recorded with a beam of a second, read wavelength of light to which the recording layer is substantially transparent, i.e., highly non-absorptive. The read-out light beam responds to the variations in reflection phase caused by the different thickness of the recording layer in pitted and non-pitted areas. The amplitude of the reflected read-out light also is affected to a small extent by the recording layer thickness variations, but this effect on read-out signal is small in relation to the effect associated with reflected light phase changes.

It would appear that this outlined approach would require relatively precise formation (as to relative thickness) of the pitted and non-pitted regions, in order to obtain substantially constant phase shift differences between the recorded and non-recorded zones. However, we have found there is a substantial thickness tolerance that will yield good signal contrast. As will be described in more detail below, we have found that the proper design of the recording layer thickness and its optical constants, in conjunction with the write and read approach of our invention, (1) allows increased writing sensitivity, (2) provides a degree of immunity to potential "frozen-in" noise sources such as pit rims or transparent debris on the layer surface and (3) provides a high depth of modulation read-out signal for a far field photodetector. Thus, a highly desirable, real-time, optical disc system is provided.

As mentioned, one preferred approach involves predeterminedly designing the record element 30 for a high sensitivity writing with a first light wavelength $\lambda_w$ and for high contrast reading with a different light wavelength $\lambda_r$. Such design involves the proper selection of recording stratum thickness, refractive index and absorption in connection with the chosen reading, and in certain preferred embodiments, additionally the writing wavelength. The principles underlying such selections can be explained more simply by first considering the write and read mechanisms separately, in more detail, and then explaining how a single element can be designed to achieve excellent results for both the writing and reading operations. However, some explanation of terminology is appropriate first. The term "optical constants" is used herein with reference to the recording stratum to collectively denote both the real component (i.e., the real refractive index) and the imaginary component (i.e., the extinction coefficient or absorption parameter) of the complex refractive index. For convenience those two components will in some instances hereinafter be referred to respectively as the refractive index (which affects surface reflectance of a material and the speed of light therein) and the absorption parameter (which characterizes the extent to which light of a particular wavelength is coupled into a material). The "absorption factor" of a recording layer as used herein is defined as the product of the weight percent of dye in the layer and the extinction coefficient of the dye at the writing light wavelength divided by the molecular weight of the dye.

Considering the writing operation in more detail, in certain materials good writing sensitivity requires that writing energy be effectively coupled into a recording layer (from the viewpoint of power efficiency in forming pits). An excellent discussion of how the coupling of writing energy into the recording layer can be enhanced by proper selection of the thickness of the recording layer is presented by A. E. Bell and F. W. Spong in the July, 1978 issue of *IEEE Journal of Quantum Electronics* at page 487. In general this article explains that optimal write situations (i.e., high absorption of writing light within a recording layer such as layer 2 in FIG. 1-A) exist when strong destructive interference, i.e., a substantial antireflection condition, exists between writing light reflected back through layer 2 from the surface 3 and light initially incident on, and reflected from, the surface of layer 2. See FIG. 1-A. This condition can be obtained by designing the record layer with its optical thickness about one-fourth the wavelength of the recording light in that layer, and by selecting the absorption parameter of the layer 2 so that the amplitude of the internally reflected light that traverses layer 2 approximately equals that of the light reflected from the surface of layer 2. The graph of FIG. 2 illustrates how the net reflectance of record light from an element such as shown in FIG. 1-A varies as a function of recording layer thickness. The above article by Bell and Spong further explains that this antireflection thickness also provides a good signal-to-noise ratio read out for such a bilayer system, if light of the same wavelength as the writing beam is used for read-out and if the pit depth formed in recording is such as to disrupt the antireflection condition. (The preferred pit depth condition removes all light absorbing material from above the reflective layer.) Note, however, that read-out light intensity must be lowered to avoid affecting the non-recorded areas during read-out. Also, the read spot's tracking and size must be carefully controlled. Thus, the element described in this article is an optimized FIG. 1-A type.

Figure 3:
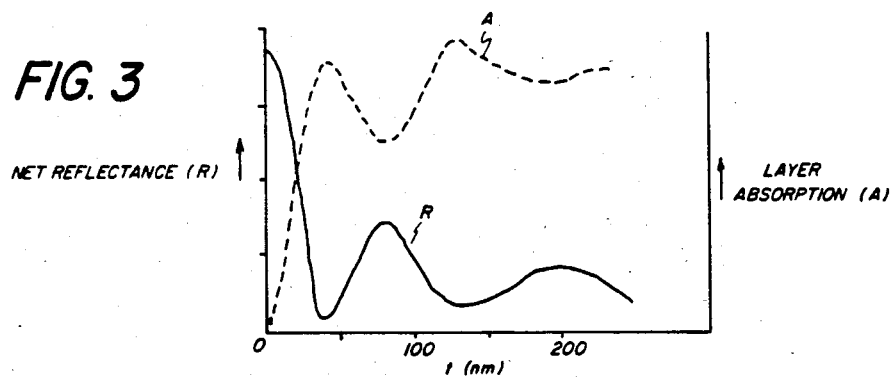
FIG. 3 is a graph illustrating the variation with respect to recording layer thickness of the reflectance and recording layer absorptance of writing light for an element such as shown in FIG. 1-C.

Certain elements such as shown in FIG. 1-C, having a thicker recording layer, will exhibit a similar variation of net reflectance with respect to recording layer thickness. FIG. 3 provides an exemplary plot of such reflectance variation (curve R), for a FIG. 1-C type element having an absorption parameter selected to yield relatively strong reflection minima. There is superimposed, using the same thickness abscissa, a plot of the variation of the recording layer's writing-light-absorption with respect to thickness (curve A). It will be noted that besides the first of the reflection minima (which occurs at a recording layer thickness of $\lambda_w/4n_w$), the curve R has a second reflection minima (which occurs at a recording layer thickness of about $3\lambda_w/4n_w$; $\lambda_w$ being the write light wavelength and $n_w$ being the real refractive index of the recording layer with respect to the writing light wavelength). As would be expected the absorption to thickness maxima, i.e., the maxima of the absorption curve A occur at thicknesses which yield minima of the reflectance curve R. However, one aspect of the absorption curve is not so expected. That is, even though the first reflectance minimum is deeper than the second, the second absorption maximum is stronger than the first absorption maximum. This indicates that, although less light escapes the thinner element (having a thickness producing the first net reflectance minimum), more light is coupled into the thicker element (having a thickness producing the second net reflectance minimum). Viewed in retrospect this apparent anomaly can be attributed to the fact that with a thinner element more light interacts with (and is absorbed by) the reflective layer, such as layer 31, than with a thicker element. In this regard it should be noted that curve A represents absorption of only the recording layer, not of the entire recording element. Based on the foregoing, it can be seen that for an element such as shown in FIG. 1-C, operation at or near the second absorption maximum (second reflection minimum) thickness can be at least equally advantageous from the viewpoint of recording efficiency as operation at or near the first absorption maximum. It will be understood that such a point of operation is substantially aligned in thickness with the second reflection minimum of a recording stratum such as 33 in FIG. 1-C, i.e., at a thickness yielding antireflection from the record element of FIG. 1-C.

Figure 4:
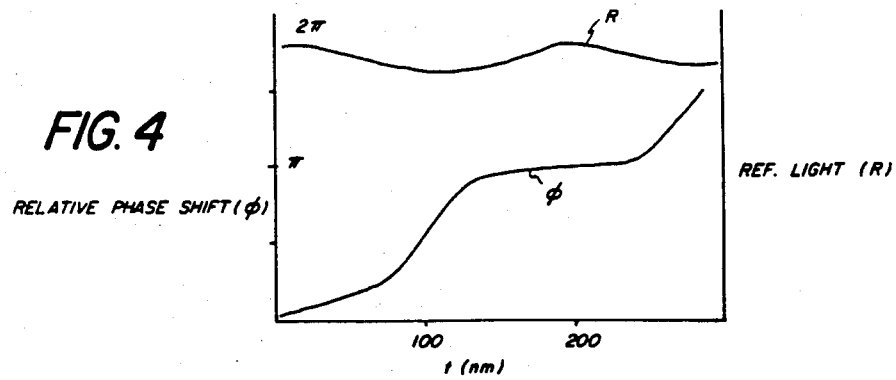
FIG. 4 is a graph illustrating the variation with respect to recording layer thickness of the phase and amplitude of reflected reading light for an element such as shown in FIG. 1-C.

Now let us consider in more detail the read-out mechanism of an element such as shown in FIG. 1-C, utilizing a light wavelength to which the recording layer is substantially transparent. We have found that, for certain recording element structures of the type shown in FIG. 1-C, the relative phase shift imparted to light reflected by the recording element does not vary linearly with respect to variations in recording layer thickness, but instead exhibits distinct zones characterized respectively by more rapid and more gradual slope, i.e., wherein a given thickness variation causes relatively high magnitude and relatively low magnitude phase shift changes to reading light reflected from the element. FIG. 4, which is a plot of the variation of the relative phase shift with respect to recording layer thickness, illustrates such a characteristic. This non-linear dependence of the phase-shift on thickness (i.e., the elements' non-linear phase shift to thickness relation) occurs because light reflected from the element is a combination of at least two significant constituents, which can differ in phase, namely: (1) the light that is reflected directly from the surface of recording layer 33 and (2) the light reflected from layer 31 that traverses through layer 33.

Referring to FIGS. 1-C and 4 and considering the passage of a recorded track of the FIG. 1-C recording layer beneath a read spot, it will be appreciated that combined or net phase of light reflected to a far field photodetector from a pitted (recorded) area such as 34 will be different than the net phase of light reflected to such photodetector from a non-pitted (non-recorded) area, because the recording layer thickness is different for recorded and non-recorded areas. The extent of difference in net phase between the light from these two areas depends upon the original layer thickness and the depth of the pit. Thus, referring to the FIG. 4 graph it can be seen that if the nominal recording layer thickness were selected at a point proximate the shoulder portion of the phase shift to thickness curve (the curve portion wherein there is a transition from a zone of gradual, or zero, slope to a zone of substantially increased slope), phase shift imparted by the recording element would increase relatively rapidly in magnitude, with small decreases in layer thickness (e.g., 30 nm) compared to the phase shift imparted by similar thickness changes commencing from a nominal thickness further to the right on the curve. For example, if the point of operation (nominal recording layer thickness) were selected at 110 nm, forming a pit having a depth of about 40 nm would cause a phase shift of about $\pi/2$ or about 90°. Such a point of operation (i.e., a nominal recording stratum thickness corresponding to a point proximate such a shoulder portion of the relative phase shift to thickness variation curve) is thus desirable from the viewpoint of providing relatively high phase shift sensitivity to thickness decreases such as caused by pit formation. An additional attribute of operating at a thickness proximate such a point is that beyond this point (i.e., to the right, toward greater thickness), a flat portion follows for a substantial amount of increased thickness. This characteristic of the recording layer minimizes the susceptibility of the read out detection system to phase shift caused by pit rims or transparent debris on the recording layer surface, i.e., renders the recording element relatively insensitive to increases in thickness of the type mentioned. Thus, in one aspect, it is a significant feature of the present invention that the recording element be designed with nominal thickness and predetermined optical constants relative to the reading light so that such advantages are provided.

Figure 5:
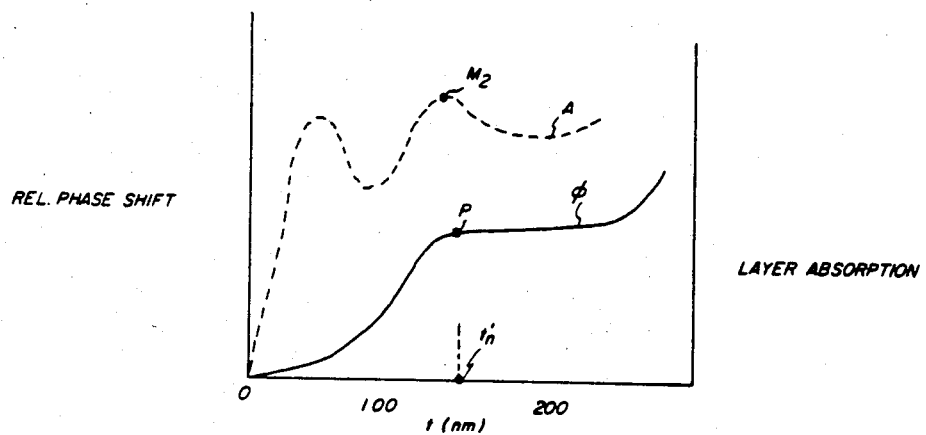
FIG. 5 is a graph superimposing the writing light absorption curve of FIG. 3 and the reading light phase shift curve of FIG. 4.

Now let us refer to FIG. 5 and note the synergistic results for writing and reading which can be obtained when recording layer thickness and optical constants are appropriately selected. In FIG. 5 the writing light absorption to thickness curve of FIG. 3 and reading light relative phase shift to thickness curve of FIG. 4 have been superimposed with the common abscissa "layer thickness". It is another significant aspect of the present invention to select a recording layer composition and configuration, in regard to predetermined write and read light wavelengths, so that an operative thickness point for writing light, proximate or near an absorption maximum on its absorption versus thickness curve (such as FIG. 3), will be generally aligned as to its thickness locus with an operative thickness point for reading light, proximate or near the shoulder portion of its phase shift versus layer thickness curve (such as FIG. 4). When the recording layer material is designed with such operating points having generally corresponding thickness (and the recording element is formed at that nominal thickness), the following complimenting advantages evolve.

First, the recording element has an exceptional sensitivity. This occurs to a significant extent because pit depth can be significantly less than prior art systems which exhibit a linear relative phase shift to thickness characteristic. Note in FIG. 5 that within the operative thickness variation range (which includes the highly sloping curve portion to the left of such operating point and the flat or gradually sloping curve portion to the right of that point) pit depth increases that decrease the layer thickness from the nominal, or operating point, thickness will effect rapid change in phase that will be imparted to the read-out light. In addition, however, sensitivity is enhanced because the recording energy is efficiently coupled in the recording layer (note the recording layer absorption at such a nominal thickness is near the second absorption maximum).

Second, because the predetermined nominal thickness is near the shoulder portion, (i.e., at the left side of the flat zone portion) of the phase shift to thickness variation curve, any transparent debris on the recording layer and any rim formation around recorded pits (which add overall layer thickness within the operative thickness variation range) will have minimal affect upon the phase of light from the unrecorded portions of the recording layer. This obviates extraneous noise and increases the range of spatial frequencies that can be recorded (because recorded pits are optically defined by their inside diameter only and not by surrounding crater rims).

Third, because the recording layer is substantially transparent to the read light there is no danger of adversely affecting the layer during read out. Thus the read light power can be of a magnitude that is greater than in other real time systems, e.g., of a power level similar to the recording power level. This moves the obtainable signal-to-noise ratio (S/N) for the system closer to a photon shot noise limit (i.e., amplifier and similar noise sources can be more readily overcome).

Fourth, because the recording layer facilitates phase shift, as opposed to amplitude variation read out, it enables the use of larger read out scanning spot sizes and less critical tracking and focussing con.trol during playback.

There is a cost incident to some of the advantages outlined above, viz., the use of two different wavelength lasers. However, for many applications the advantages of this real time writing, phase shift reading system will more than warrant such additional cost. Further, in certain embodiments certain advantageous aspects of the present invention can be retained in a system using the same wavelength light for writing and reading.

From the foregoing explanations, it will be understood that the present invention contemplates record elements having predetermined nominal thickness and optical constants that are optimized with respect to read light and to both read and write light respectively. Specifically, the elements' optical constants are optimized with respect to the chosen reading light wavelength so that decreases from said predetermined nominal thickness cause relatively high magnitude phase shifts of reflected read light and increases from said predetermined nominal thickness cause relatively low magnitude phase shifts of reflected read light. Further, the elements' optical constants can be optimized with respect to the chosen writing light wavelength so that a recording layer absorption to thickness maximum exists near the predetermined nominal recording stratum thickness. Approaches for designing such elements will be explained in more detail subsequently; however, a description of some useful and preferred record element materials is appropriate first.

There are a wide variety of materials suitable for the supports and recording stratum of recording elements of the present invention. Important support characteristics are that it have a melting point that avoids deformation and a smooth reflective surface. Materials such as reflective metals or glass, resin films such as polyethylene terephthalate coated with thin metal layers, e.g., 500 Å of aluminum, are exemplary but there are many others.

Although there are other recording layer materials that can be used in implementing element design according to the present invention, we have found dye-binder material to be particularly suitable.

A number of useful binders and dyes are disclosed in the above-noted U.S. application Ser. No. 023,434, filed Mar. 23, 1979 which is incorporated herein for such teachings as well as for teachings of other examples of other element structures such as supports. In general it is preferred according to the present invention that the recording layer be an amorphous material. Thus the mixture of binder and absorptive material (e.g., the dye which absorbs at the writing wavelength) desirably are compatible to mix in such a way that no crystalline structure is formed.

Useful binders include for example cellulose acetate butyrate, polystyrene, polysulfonamide, Lexan (polycarbonate), cellulose nitrate, hydroabietyl alcohol (sold by Hercules Chemical Company as Abitol AUK 257), poly(ethyl methacrylate), poly(vinyl butyral), and combinations thereof. In some instances it may be useful to include a plasticizer in the mixture to achieve desired deformation capabilities. It is highly desirable that the selected recording layer be soluble in a solvent (e.g., such as cyclohexanone, acetone, benzene, xylene or the like) to facilitate coating.

There are a wide variety of useful dyes that can be considered for their absorptivity at the writing wavelength and compatibility with the binder of choice. A number of such dyes that are useful for consideration when writing with an argon-ion laser (wavelength=488 nm) and reading with a helium-neon laser (wavelength=633 nm) are described in the above-cited application, such disclosure being incorporated herein by reference. Additional useful light absorber-binder materials are disclosed in U.S. Pat. No. 4,270,130, which is also incorporated herein by reference for that purpose.

Figure 6:
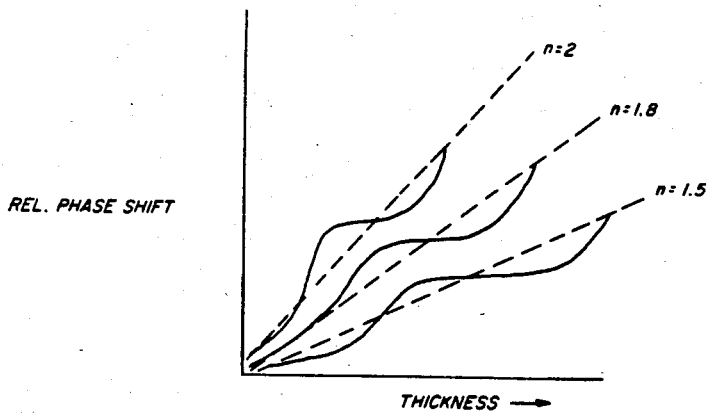
FIG. 6 is a graph illustrating the variation with respect to recording layer thickness of the phase of reflected reading light (like FIG. 4) for different refractive index recording materials for an element such as shown in FIG. 1-C.

In designing optimized recording elements according to the present invention, certain system parameters can be determined by general apparatus and materials characteristics. For example, the writing and reading light wavelengths could be selected on the basis of commercially available laser apparatus. The components of the recording layer's dye-binder mixture could be selected for their known optical characteristics relative to the chosen wavelengths (i.e., substantially transparent to the read wavelength and at least moderately absorptive to the write wavelength) and for their known physical characteristics relative to the physical dynamics of the desired write-read system (e.g., the glass transition temperature, viscosity, heat capacity, thermal diffusivity and thermal decomposition temperature of the dye-binder combination relative to the laser power, optics and recording speed desired for the write-read system). Also, it will be helpful to consider FIG. 6 in regard to selection of a preliminary dye to binder mixture. That Figure illustrates that the general steepness (indicated by dotted straight lines) of relative phase shift to thickness curves increases with increased refractive index of the recording layer. Thus from the viewpoint of record sensitivity (with respect to read light), higher refractive index material combinations will be advantageous, i.e., as the refractive index increases, the pit depth required to achieve a given phase shift decreases. However, it will be noted that the steeper the curve, the shorter is the flat portion following the shoulder. Therefore it is usually desirable to accept some compromise as to curve steepness in order to maintain the tolerance to crater rims and transparent debris that is provided by extended flat portions of the curve. After such considerations a dye-binder mixture is prepared in a preliminary concentration, e.g., a 1:1 ratio by weight and coated in a desired manner. As pointed out in the aforementioned application Ser. No. 023,434, it is usually preferred that the recording layer have an absorption factor of 20 or greater with respect to the selected writing light wavelength. As used herein with respect to the recording layer, the term absorption factor is defined as the product of the weight percent of dye (or other colorant) included in the recording layer and the extinction coefficient of the dye (or other colorant) at the selected recording wavelength, divided by the molecular weight of the dye (or colorant), and having the units of liter per gm. cm.

The refractive index of this preliminary mixture is measured at the reading light wavelength and based on this measurement, a curve (such as the one shown in FIG. 4) indicating relative phase shift with varying layer thickness is plotted. It will be understood by those skilled in the art that such curves can be calculated without the necessity of measuring a large number of different-thickness coatings.

Having plotted the relative phase shift to thickness curve for a preliminary dye-binder mixture, the selection of a preliminary nominal thickness is to be made. As discussed, it is desired that the final nominal thickness be within, or proximate, a thickness zone that corresponds to the shoulder portion of the phase shift curve (i.e., its transition zone from a generally flat to much steeper slope). The preliminary nominal thickness is selected according to this criterion, for example see point P on the curve $\phi$ of FIG. 5 which defines a preliminary thickness $t_n'$. In certain instances selection based on such criteria will be adequate to provide highly useful elements.

However in certain instances it will be desirable to further optimize design by improving recording efficiency. Thus given such a selected preliminary nominal thickness $t_n'$ and based on the understanding that it is desired to have a maximum, e.g., the second absorption maximum $M_2$, of the recording layer's absorption to thickness curve in general alignment with $t_n'$ (and thus point P of curve $\phi$), the following relation can be stated:

$$t_n' = \frac{3\lambda_w}{4n_w} \text{ or } n_w = \frac{3\lambda_w}{4t_n'};$$

where $\lambda_w$ is the writing light wavelength and $n_w$ is the refractive index of the recording layer (with respect to writing light) that would cause the desired alignment to exist. (Recall the second absorption maximum for a recording layer having index $n_w$ will occur at a thickness very near the point $3\lambda_w/4n_w$.)

Thus a desired refractive index $n_w$ for a preliminary nominal layer thickness $t_n'$ of the preliminary dye-binder mixture can be calculated. The actual refractive index (to writing light) of the preliminary dye-binder mixture is next measured and compared to the desired index $n_w$. Based upon the difference between the measured refractive index and the desired index $n_w$, concentration adjustments can then be made to the dye-binder mixture. It will be understood that varying relative concentrations of the dye-binder mixture to adjust its refractive index relative to writing light may have some small effect on its refractive index relative to reading light, but this latter shift will be much less because the mixture is substantially transparent to read light. The above steps can be reiterated (selecting a new $t_n'$) if the shift is significant.

Elaborating somewhat on the mode of concentration adjustment mentioned above, one skilled in the art will understand from the foregoing that a shift in the thickness locus of an absorption curve maximum depends on the refractive index of the dye-binder mixture (to writing light), and that the strength of an absorption maximum depends on the absorption factor of the dye-binder mixture. The refractive index of the dye-binder mixture varies with dye and binder concentrations according to the relation:

$$n^2_{mixture} = n^2_{binder} + (n^2_{dye} - n^2_{binder}) \cdot x_{dye}$$

where x dye is the mole fraction of dye. In the event that adjustment of the mixture concentration (to obtain a useful general alignment of the phase shift curve shoulder portion and an absorption curve maximum) results in an unacceptably low strength absorption maximum another dye can be selected for use in the mixture. One skilled in the art will recognize that comparison of the optical constants a first-tried dye with known optical constants of other similar dyes will greatly facilitate such alternate dye selection.

At this stage, however, it should be reemphasized that the present invention does not require precise coincidence of the writing light's absorption curve maximum with a selected point on the reading light's phase shift curve. Highly useful results can be obtained when the finally selected nominal thickness differs somewhat from either or both of the points $M_2$ and P in FIG. 5. That is, highly useful elements can be designed wherein the predetermined nominal thickness is not precisely aligned with either a shoulder portion of the read light phase shift curve nor an absorption maximum of the write light's absorption curve, but is in general alignment with respect to both. As useful guidelines, we have found it desirable that the finally selected nominal thickness be selected with respect to the absorption curve maxima so that at least 50% of the writing light is absorbed by the recording layer. From the viewpoint of final nominal thickness vis a vis the phase shift curve, it is highly preferable that the nominal thickness be selected sufficiently close to the shoulder portion of the phase shift curve that crater rims formed during pit recording will fall in a thickness zone corresponding to the phase shift curve's flat portion. That is, sufficient space should be left on the back of the curve's "stair step" to accommodate crater rim height. Similarly, the nominal thickness should not be so far over the shoulder (i.e., on the relatively rapid slope curve portion) that rims effect significant phase shift changes.

Figure 8:
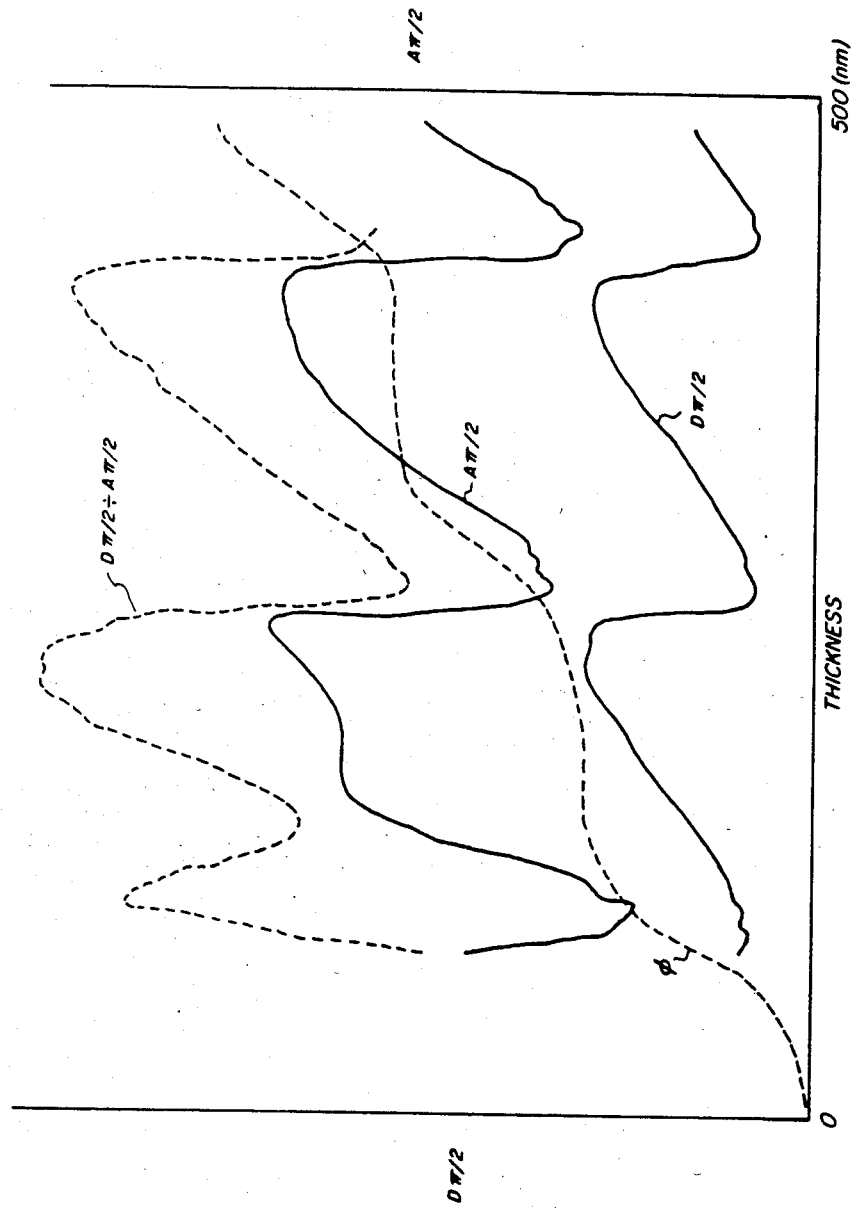
FIG. 8 is a graph indicating pit depth per constant phase shift $D\pi/2$ and layer absorptance within that pit depth $A\pi/2$. Superimposed on this graph are dotted line representations of a relative phase shift curve and of a quotient curve $D\pi/2 \div A\pi/2$.

One other aspect pertaining to final nominal thickness selection will be of interest to those designing record elements according to the present invention. As will be understood by those skilled in the art, the power required for forming a pit of given depth will be related to some extent to the intralayer interference characteristics of a particular recording stratum (thickness and optical constants). The selection of a final nominal layer thickness can be further optimized by taking such characteristics into account. Reference to FIG. 8 will clarify how this can be done, bearing in mind that the general desired condition is to have a high energy concentration near the upper portion of the recording layer.

In FIG. 8, the phase shift to thickness curve $\phi$ for an exemplary element is plotted in superposition with a $D\pi/2$ curve, an $A\pi/2$ curve and a $D\pi/2 \div A\pi/2$ curve. The $D\pi/2$ curve is illustrative of the physical pit depth required to yield a $\pi/2$ phase shift at varying recording layer thickness, and the $A\pi/2$ curve is illustrative of the percentage of light absorbed in the depth $D\pi/2$ at varying overall layer thicknesses (those curves can be calculated based on the recording stratum's optimal constants). The $D\pi/2 \div A\pi/2$ curve thus is a plot indicating the power requirement for obtaining the desired phase shift (i.e., a $\pi/2$ shift) during recording and will be of assistance in final selection of nominal thickness. It is to be noted that the same analysis can be undertaken regarding other desired phase shifts, e.g., $\pi/4$, that might be used in given detection systems.

However, it is to be noted that the minimum on the "power" curve should only influence nominal thickness selection where it does not require a nominal thickness on the high slope portion of the phase shift curve $\phi$. (Such a selection of nominal thickness would render the element highly sensitive to crater rims and debris). It will be noted in FIG. 8 that only the first power curve minimum does not align with a high slope portion of the phase shift curve and it will be useful in determination of a nominal recording layer thickness. This analysis also serves as a check regarding the appropriateness, from intralayer energy absorption viewpoint, of the material and thickness parameters chosen based on general alignment of the phase shift and absorption curves.

Briefly summarizing then, the optical constants of the recording stratum are first adjusted (e.g., by varying dye-binder concentration) to obtain general thickness alignment of the phase shift curve shoulder and absorption curve maximum and then, if desired, the final nominal thickness can be selected within the range of such general alignment based on the foregoing type analysis regarding the intralayer energy profile of that recording layer. It will be appreciated, of course, that for some recording layer materials and/or for some applications, the level of absorption may be adequate in thickness zones not generally aligned with an absorption maximum. In such circumstances the design of the element can be optimized solely based on the reading light phase shift curve aspect of the present invention. However, even in these situations it may be useful to consider the intralayer interference affects in accord with the FIG. 8 approach to minimize power required for the needed phase shift.

The following Examples of specific bilayer elements will be useful in further understanding certain aspects of the present invention:

EXAMPLE I

A recording layer coating solution was formed containing one part cellulose nitrate binder, one part of the dye SK-1 and 60 parts solvent (cyclohexanone). The dye SK-1 has the structural formula:

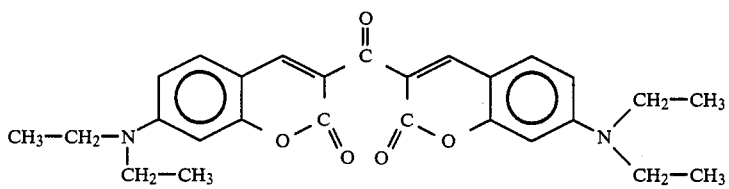

and the mode of preparation and utility of coumarin compounds such as SK-1 are described in *Research Disclosure* Publication No. 16167 by Industrial Opportunities Ltd., U.K. The coating was filtered and whirl coated onto a smoothed circular glass substrate of radius, of about 150 mm and a thickness about ¼ inch, having a reflective aluminum layer of about 500 Å. The coating was dried and resulted in a recording layer thickness of about 1100 Å. The dried coating had an absorption factor of about 64 at 488 nm. The following parameters characterized the significant optical constants of the element so formed with respect to writing light (488 nm) and reading light (633 nm).

|  | $\lambda_w$ (488) | $\lambda_r$ (633) |
|---|---|---|
| Recording Layer: | $n_c = 2.25 + i0.45$ | $n = 1.80$ |
| Reflective Layer: | $n_c = 0.70 + i4.8$ | $n_c = 1.0 + i6.0$ |
| Substrate: | $n = 1.53$ | $n = 1.53$ |

Figure 9:
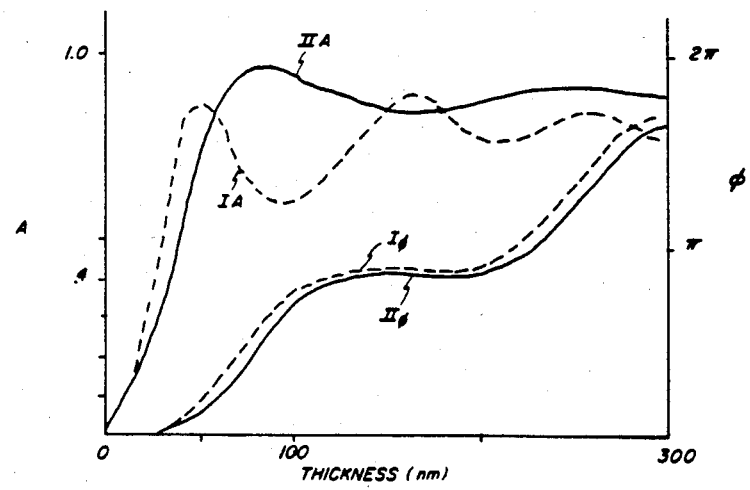
FIG. 9 is a graph showing curves like FIG. 5 but of Example I and II recording layer materials.

The absorption curve $I_A$ and phase shift curve $I_{100}$ shown in FIG. 9 respectively illustrate the variation of the Example I recording layer material's relative phase shift and net absorptance to thickness variation in a manner such as described previously with respect to FIG. 5.

Tracks were recorded on the record element at varying power levels using an argon-ion laser light beam (488 nm) focussed with a numerical aperture $NAg = 0.525$ while the disc was rotating at 1800 RPM. (The term NAg represents the numerical aperture of the focussed gaussian beam of light measured to its $e^{-2}$ irradiance diameter.) The recorded tracks were then read back with a similarly focussed helium-neon laser light beam (633 nm), having a power of about 1 mW on the disc surface, and a plot such as shown by curve I of FIG. 10 was made to illustrate the read-out signal to noise ratio obtained for differing recording power levels. (The ordinate of FIG. 10 denotes the demodulated TV signal flat field SNR.)

EXAMPLE II

A recording layer coating solution was formed containing one part cellulose nitrate binder, one part SC-1 dye and 60 parts solvent (cyclohexanone). The dye SC-1 has the structural formula:

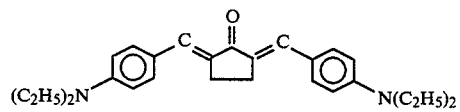

and the mode of preparation of the dye is disclosed in U.S. Pat. No. 4,415,621. The layer was coated on a reflectively coated circular disc such as described in Example I and the dried coating resulted in a recording layer of about 1000 Å thickness. The dried coating had an absorption factor greater than 20 at 488 nm. The following parameters characterize the significant optical constants of the element so formed with respect to writing light (488 nm) and reading light (633 nm):

|  | $\lambda_w$ (488) | $\lambda_r$ (633) |
|---|---|---|
| Recording Layer: | $n_c = 1.5 + i0.60$ | $n = 1.77$ |
| Reflective Layer: | $n_c = 0.70 + i4.8$ | $n_c = 1.0 + i6.0$ |
| Substrate: | $n = 1.53$ | $n = 1.53$ |

The absorption curve $II_A$ and phase shift curve $II_\phi$ shown in FIG. 9 respectively illustrate the variation of the Example II recording layer material's relative phase shift and net absorptance to thickness variation in a manner such as described previously with respect to FIG. 5.

Figure 10:
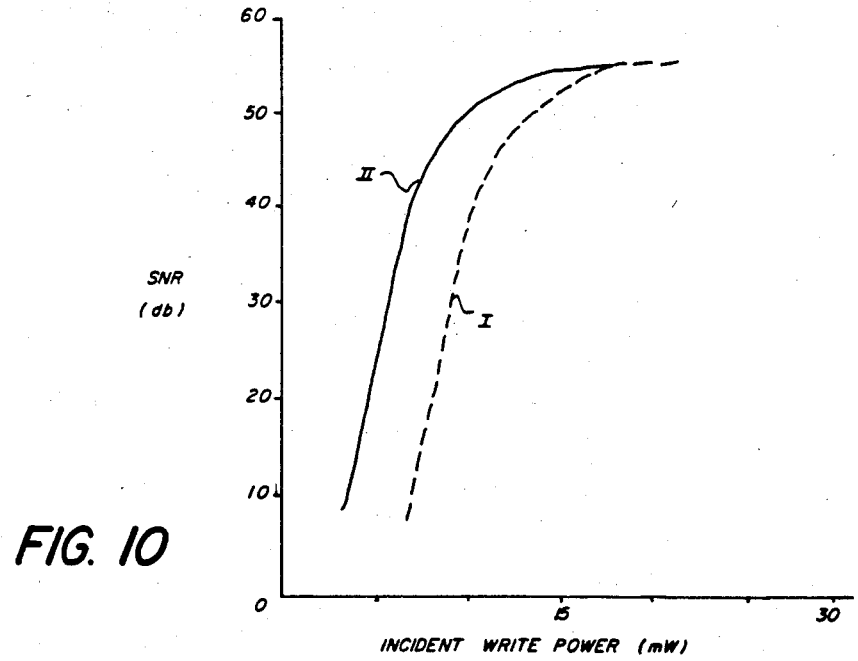
FIG. 10 is a graph showing the read-out signal to noise ratio of the Example I and II elements when recorded at varying writing power levels.

Tracks were recorded and read back from the disc in the same manner described to Example I and a plot such as shown by curve II of FIG. 10 made to illustrate the resultant read-out signal to noise ratio obtained for differing recording power levels.

Considering the results of these examples several factors are noteworthy. First it can be seen that both the Example I and Example II discs attain a good signal to noise ratio by implementing the aspect of the present invention whereby nominal recording stratum thickness is selected in general alignment with the shoulder portion of the phase shift to thickness curve (curves $I_\phi$ and $II_\phi$). On comparison of curves I and II of FIG. 10, however, it will be noted that the disc of Example II (curve II) required considerably less power throughout the range of comparison, in obtaining an equivalent signal to noise ratio read-out with the Example I disc. This is believed significantly attributable to the fact that the Example II disc implemented the additional aspect of the present invention whereby an absorption maximum of the absorption to thickness curve (curve $II_A$) is also generally aligned with the nominal recording layer thickness. Note also, that because the absorption of the Example II element is generally high throughout a wide thickness range, it is one in which analysis of the type described with regard to FIG. 8 will be of significant use.

The foregoing discussion has specifically illustrated only bi-layer element embodiments of the present invention (i.e., elements comprising only a reflecting layer and a recording layer on the support). However, it is to be understood that the practice of the present invention is not limited to such bi-layer configurations; other multi-layer configurations can be optimized according to the present invention. In this regard the term "recording stratum" is used to denote the layer(s) over the reflective layer of both bilayer and other multilayer recording elements. For example, a dielectric spacer layer(s) can be provided between the recording layer and the reflective layer to cooperate in design optimization according to the present invention. Such spacer layers can be substantially transparent to both write and read light wavelengths and preferably have a refractive index creating an interface of low dielectric contrast with the recording layer. Beyond these characteristics, however, the spacer layer(s) are designed with thickness(es) and optical constants that cooperate with the thickness and optical constants of the recording layer in providing an element with: (1) the high absorption to writing light and (2) the high sensitivity phase shift to thickness variation for reading light, that were described above regarding bi-layer structures.

To accomplish these results the following routine is useful. First, a desired recording layer material (e.g., amorphous dye-binder mixture) and thickness is selected. This selection is again based upon optical characteristics (substantial transparency to read light and absorptivity to write light) and upon other physical heat-deformation characteristics. Having selected a recording layer material and thickness, its refractive indices to writing and reading light are measured. Next, absorption versus thickness curves and phase shift versus thickness curves are calculated and plotted for the recording layer, cooperating in a stacked relation with various alternative dielectric materials meeting the general requirements stated above (i.e., transparency and low dielectric contrast relative to the recording layer). A visual comparison of these curves will readily show when a particular dielectric spacer-recording layer composite yields a useful thickness alignment between the writing light's absorption-to-thickness curve maxima and the reading light's phase-shift-to-thickness curve shoulder portion. The recording element is then fabricated with that dielectric spacer element in thickness corresponding to the thickness alignment point of the curves.

For example, given a specific recording layer material and thickness, increases in the thickness of a given spacer element will progressively shift the shoulder portion of the element's phase shift curve to the left as the absorption curve undulates as to absorption-to-thickness curve maxima. This is caused by the differing affect of thickness changes to the differing wavelength write and read light. Appropriate general alignments can be achieved in this way as well as various others.

One advantage which pertains to the above-described spacer embodiments of the present invention is that light absorption is concentrated in a thinner recording layer thickness and the thermal effectiveness in deforming the layer thus is enhanced. Further advantage can be obtained by choosing the dielectric spacer element as a thermal insulator. However, the provision of additional layers also raises the level of complexity of element fabrication.

Referring now to FIG. 7, one exemplary embodiment of write-read apparatus 70 for practice of the present invention is illustrated schematically. The apparatus 70 in general comprises a laser writing subsystem $L_w$, a laser reading subsystem $L_r$ and a platen 71 for rotating a disc D fabricated according to the above teachings. The subassemblies $L_w$ and $L_r$ are shown diametrically opposite only for ease of illustration; it will usually be preferable to provide such subassemblies more nearly side-by-side for common coarse radial indexing relative to tracks of the disc D. Also, each of the subassemblies desirable will have tracking and focus servo-systems of a type known in the art, so that the actual location of optical elements will usually vary from that shown in the FIG. 7 diagram. Moreover, a single optical assembly can be used for both (simultaneous) writing and reading so long as both the writing and reading light beams are brought into the assembly such that the single focussing lens therein focusses both light beams in the same general vicinity of the record element.

The subassembly $L_w$ can comprise a writing laser 72 of a first wavelength, a light modulator 73, such as an acoustic cell, and a series of light-refractive elements 74 which provide a tightly focussed beam at the surface of the recording layer of disc D. A signal processor 75 addresses the modulator 73 to turn the beam on and off in accord with the encoded pit generating signal.

The reading subassembly $L_r$ comprises a read laser 76 of a second wavelength and focusing optics 77 which provide a read spot that extends at least across the tracks of the disc. As described, the present invention allows less-tightly focussed read-out beams which can be on the order of twice the diameter of the writing light spot or greater. Also, it has been pointed out that reading light power can be greater than in prior art real-time techniques. Typically it is useful according to the present invention to provide read-out power of the same approximate magnitude as the writing light power.

Desirably a polarizing beam splitter 78 and a quarter wave plate 79 are provided so that read light reflected from the disc surface will be directed back through a portion of the focusing optics 77 to photodetector means 80. Detection means 80 can be of push-pull (or split detector) type such as described in the U.S. Pat. No. 4,065,786 in which case the desired phase shift would be in the order of one-quarter of the read wavelength. Alternatively detection means can be of the central aperture type which is also discussed in U.S. Pat. No. 4,065,786, in which case the desired phase shift would be in the order of one-half wavelength. A discussion of split field and central aperture detection systems is also set forth in an article entitled "Simplified Diffraction Theory of the Video Disk" by A. Korpel at page 2037 *Applied Optics,* July 1978 (Vol. 17, No. 13). In either mode, the detected signal is output to signal processing means 81 for decoding, etc.

The disc D is constructed in one of the optimized configurations described above, for the particular wavelengths of the write and read lasers 72 and 76 respectively.

In operation the disc so constructed is rotated by platen 71 to effect scanning motion relative to the modulated beam from writing laser 72 along its tracks, thus forming alternating pitted and non-pitted track portions. Similarly the rotation of the disc relative to the beam from reading laser 76 effects scanning motion between the tracks and the beam to produce a modulated light signal to detector 80.

Various alternative optimized disc structures according to the present invention will occur to those skilled in the art, as will alternative apparatus and modes for using such structures. For example, instead of a thin metal film reflector on the disc, a dielectric stack reflector could be utilized if desired. Also, transparent, thermal-mechanical barrier layers can be provided over the recording layer. As will be apparent to one skilled in the art, the term "light" is used herein in its general sense, i.e., to include electromagnetic radiation outside the visible range that is useful in practice of the inventive teachings hereof. The invention has been described in detail with particular reference to preferred embodiments thereof, however it will be understood that variations and modifications can be effected within the spirit and scope of the invention.

What is claimed is:

1. A method for optically writing and reading information on an optical recording element, said method comprising the steps of:
   (a) providing an optical recording element having a recording stratum of predetermined nominal thickness overlying a reflective support, said stratum being highly absorptive of light of a first wavelength and heat-deformable by such light to form recorded pits of decreased stratum thickness, said stratum being highly transparent with respect to light of a second wavelength and having optical properties such that a stratum from said nominal thickness to said decreased stratum thickness will produce a substantially greater phase shift in reflected light of said second wavelength than will a stratum thickness increase from said nominal thickness of equal magnitude;
   (b) writing information on said recording element by scanning said stratum with an intensity-modulated beam of light of said first wavelength, such beam of light being effective to selectively decrease the thickness of said stratum according to information to be written;
   (c) scanning the written-upon stratum with a beam of light of said second wavelength to produce reflected light having an instantaneous phase determined by the thickness of the scanned portion of said stratum; and
   (d) sensing the instantaneous phase of said reflected light.

2. The method according to claim 1 wherein the information is recorded on the optical recording element along tracks, and wherein said scanning step is effected with a beam of light at least twice the cross-track dimension of such recorded portions.

3. The method according to claim 1 wherein said decreased stratum thickness is such as to produce about $\pi/4$ or about $\pi/2$ phase difference between light reflected from the pitted and non-pitted portions of said stratum.

4. A method for reading high density optical information, said method comprising:
   (a) providing an optical recording element comprising a support having a smooth surface which is highly reflective to light of a predetermined wavelength, and a recording stratum which overlies said support, said stratum having unrecorded portions of predetermined nominal thickness and recorded pit portions of reduced thickness, said stratum being highly transparent with respect to said predetermined wavelength and having optical properties with respect to said predetermined wavelength such that a decrease in stratum thickness from said nominal thickness to said reduced thickness gives rise to a substantially larger change in phase of reflected light of said wavelength than does a corresponding increase in stratum thickness from said nominal thickness;
   (b) scanning said stratum with a reading laser beam of said predetermined wavelength; and
   (c) sensing the reading light reflected from said optical recording element to produce an electrical output signal based primarily on the phase differences between the reading light reflected from said recorded and unrecorded portions.

5. The method according to claim 4 wherein said sensing step is accomplished with a far-field detector.

6. The method according to claim 4 wherein said reduced thickness is such as to produce about $\pi/4$ or about $\pi/2$ phase difference between light reflected from said unrecorded and recorded portions of said stratum.

* * * * *